United States Patent Office 2,831,000
Patented Apr. 15, 1958

2,831,000

PARTIAL ESTERS OF HEXAHYDROKOJIC ACID

Jay S. Buckley, Jr., Groton, Russell D. Drinkard, New London, and Paul D. Thomas, Groton, Conn., assignors to Chas. Pfizer & Co., Inc., Brooklyn, N. Y., a corporation of Delaware No Drawing. Application August 5, 1955
Serial No. 526,767

9 Claims. (Cl. 260—345.8)

This invention is concerned with partial esters of hexahydrokojic acid which are useful as emulsifiers, solvents, and as intermediates for preparing emulsifiers. Hexahydrokojic acid is a cyclic trihydric alcohol with the following structural formula:

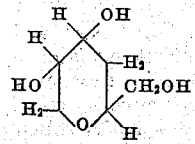

Hexahydrokojic acid is most readily prepared by the catalytic hydrogenation of kojic acid. Such a process is the subject of copending application Serial No. 526,768, filed August 8, 1955.

In particular, the valuable partial esters of hexahydrokojic acid of this invention embody the mono and di fatty acid esters of hexahydrokojic acid. The esters of both saturated and unsaturated, straight or branched chain fatty acids are useful. When the acid contains more than about six carbon atoms, the partial esters are useful as emulsifiers. Esters of the following acids are exemplary of this type: caproic, caprylic, 2-ethylhexanoic, pelargonic, capric, undecylenic, myristic, palmitic, oleic, and stearic. The lower fatty acid esters are less useful for this purpose because of their reduced oil solubility. However, they are useful as solvents and may be further esterified with a fatty acid of the above type to yield emulsifiers.

These valuable esters can be prepared by a variety of methods. For example, by treatment of hexahydrokojic acid with an acylating agent. By acylating agent is meant an acid halide, anhydride, or a mixed anhydride of the esterifying acid. A useful type of mixed anhydride is that derived from a half-ester of carbonic acid and the acid to be used for esterification. The free fatty acid may also serve as an acylating agent under certain conditions. For example, if the fatty acid and hexahydrokojic acid are mixed and heated to about 220° C., water distills out of the reaction mixture and a mixture of partial esters of hexahydrokojic acid, possibly containing some triester of hexahydrokojic acid, is obtained.

With acylating agents such as acid halides or anhydrides, it is generally convenient to use a solvent. The choice of solvent is not critical although certain requirements must be met. The main requirement other than that the reactants dissolve is that the solvent be inert toward the acylating agent. Thus hydroxylic solvents such as water and the alcohols are unsuitable. Aldehydes and ketones containing active hydrogen atoms are similarly unsuitable since they are likely to react with the acylating agent. Suitable solvents include esters such as ethyl acetate, methyl acetate, butyl formate, and ethyl propionate, tertiary organic amines such as pyridine, quinoline, triethylamine and dimethylethylamine, and the lower chlorinated aliphatic hydrocarbons such as chloroform, trichloroethane and tetrachloroethylene.

It is preferred to employ a tertiary amine in the reaction mixture, if not as a solvent, at least in an amount corresponding to the acylating agent. This is particularly desirable when an acyl halide is used as the acylating agent since the amine neutralizes the hydrogen halide evolved as a by-product of the reaction. In the absence of a tertiary amine, the mineral acid leads to side reactions of the hexahydrokojic acid such as rupture of the ring and dehydration. The use of tertiary amines appears to have a further effect. They appear to serve as catalysts for the reaction. It is thought that the acid halide first reacts with the tertiary amine to form an intermediate salt which is a more active acylating agent by virtue of its increased polarity than the original acid halide. The tertiary amines, referred to above as solvents, and pyridine in particular, are particularly desirable since they are able to serve not only as the solvent, but also as the highly useful tertiary organic amine neutralizer and catalyst. The water soluble tertiary amines are preferred since recovery of the product is simpler from a water soluble solvent. For instance with pyridine or triethylamine as the solvent, the product, the hexahydrokojic acid partial ester, precipitates when the mixture is poured into water. By adjusting the proportions of reactants in this type of a process of the invention, it is possible to obtain products with compositions corresponding closely to those of the pure mono and diesters. This is not possible when esterification is carried out directly from the acid with heat.

The nature of the product obtained depends in part upon the proportions of reactants employed. Thus if it is desired to prepare the monoester, ⅓ of a mole of acid chloride per mole of hexahydrokojic acid is employed. Excess hexahydrokojic acid may be employed in this case. To obtain a preponderance of the diester, ⅔ of a mole of the acid chloride is used.

The exact structures of these valuable partial esters of hexahydrokojic acid is not known. Hexahydrokojic acid contains three different alcoholic hydroxyl groups, and thus three monoesters and three diesters are possible. In addition, there are three asymmetric carbon atoms which give rise to various stereoisomers of each possible ester. In spite of the fact that the partial esters obtained by the above process have sharp melting points and their elementary analyses correspond to mono and diesters, it seems likely that mixtures of products are obtained in each case. These products are optically inactive. The question of structure, however, is not germane to the usefulness of these valuable derivatives of hexahydrokojic acid. Thus when the term partial ester of hexahydrokojic acid is employed, what is meant is a mono or diester of hexahydrokojic acid regardless of structure and mixtures thereof. With the diesters, the two acyl groups may be the same or different.

An alternative method of preparing these valuable compounds is by transesterification from various natural glycerides. Thus, when hexahydrokojic acid is heated at from about 170° C. to about 240° C. with a vegetable oil such as corn oil, peanut oil, cottonseed oil, or olive oil in the presence of a transesterification catalyst, a mixture of mono and di-glycerides and a mixture of mono and di-fatty acid esters of hexahydrokojic acid is produced. At the end of the reaction the catalyst is removed by some suitable means such as filtration, neutralization or a combination thereof. The transesterification catalyst referred to above are basic substances such as the alkali and alkaline earth metal hydroxides, lime, alumina, and various soaps such as calcium, aluminum, magnesium, zinc, sodium, and potassium soaps. These resulting compositions have excellent emulsifying properties. Small amounts of triglycerides, trihexahydrokojic acid esters, glycerol, and hexahydrokojic acid are also present in the mixture. Of course, a pure product of specific composition cannot be obtained by this process, but nevertheless, a composition containing one or more of the valuable products of this invention is produced which is a highly useful emulsifier.

The valuable ester-type emulsifiers of this invention are all relatively insoluble in water, but soluble in oils, fats and most organic solvents. Stable emulsions are obtained when a valuable product of this invention is rigorously mixed with an oil and water or an aqueous solution in a suitable apparatus. By oil is meant an oil, fat or other water insoluble organic liquid. Said emulsion then comprises an oil phase, an aqueous phase, and one of the partial fatty acid esters of this invention. Thus the novel partial esters of this invention are applicable, among other uses, to the preparation of emulsions of oil soluble medicinal ingredients such as vitamins, vitamin extracts, and vitamin concentrates, which are desirable incorporated in an oil vehicle and then dispersed in water. A further use is as an additive for the hydrogenated type of vegetable shortening useful in the baking industry. A superior feature of these valuable products for this use is their heat stability. For example, a partial ester of hexahydrokojic acid and palmitic acid can be heated at 200° C. without any sign of decomposition such as fuming and discoloration. This property is in contrast to the corresponding behavior of the mono and diglycerides which decompose at about 180° C. and thus are unsuited for use in fats intended for deep frying.

The following examples are intended to further illustrate the invention but are not to be considered as placing any limitation thereon.

Example I

Hexahydrokojic acid, 14.8 grams (0.1 mole) was dissolved in 40 milliliters of dry pyridine and placed in the reaction vessel which had been purged with nitrogen. Palmityl chloride, 15 g. (0.0546 mole), was slowly added to the mixture from a dropping funnel. The temperature immediately rose to about 40° C. whereupon the flask was cooled in an ice bath and the remainder of the palmityl chloride was added at a temperature of about 25° C. The mixture was poured into a slurry of ice and water and the product which precipitated was collected on a filter. It was washed on the filter with dilute sodium bicarbonate and then with water and dried in vacuo. The crude product was then recrystallized from ethanol using decolorizing carbon on the hot solution. The diester, hexahydrokojic acid dipalmitate, was obtained as a white crystalline wax-like solid, melting point 76.5–77.5° C.

*Analysis.*—Calcd. for $C_{38}H_{72}O_6$: C, 73.1; H, 11.5; M. W. 624. Found: C, 73.2; H, 11.6.

This material had a saponification equivalent of 330 which corresponds to a molecular weight of 660. Two additional crops of the dipalmitate ester were obtained by concentrating the filtrate from the above recrystallization. A fourth crop of much more soluble material was then obtained which had a melting point of 42–44° C. which proved to be a monopalmitate ester. It was recrystallized from ether.

*Analysis.*—Calcd. for $C_{22}H_{42}O_5$. C, 68.5; H, 10.9. Found: C, 69.0; H, 11.3.

Example II

The procedure of Example I was repated with the substitution of 0.06 mole of caproyl chloride for the palmityl chloride used above. A dicaproate ester was obtained in addition to a small amount of the monocaproate ester which was recovered from the recrystallization filtrates.

Example III

Samples of hexahydrokojic acid monopalmitate and hexahydrokojic acid dipalmitate weighing 0.5 g. and 4.5 g. respectively were placed in separate Pyrex test tubes and slowly heated in an oil bath to 200° C. Both materials melted at their respective melting points and remained as colorless liquids without any apparent sign of decomposition such as gas evolution, smoking or discoloration. When the samples had cooled they resolidified and were found to melt at substantially the same temperature as they did before the heat treatment.

What is claimed is:

1. A partial fatty acid ester of hexahydrokojic acid wherein the acyl group moiety is an aliphatic hydrocarbon.

2. A mono-fatty acid ester of hexahydrokojic acid wherein the acyl group moiety is an aliphatic hydrocarbon.

3. A di-fatty acid ester of hexahydrokojic acid wherein the acyl group moiety is an aliphatic hydrocarbon.

4. As an emulsifier, a partial fatty acid ester of hexahydrokojic acid wherein the acyl moiety is an aliphatic hydrocarbon and contains at least 6 carbon atoms.

5. As an emulsifier, a mono-fatty acid ester of hexahydrokojic acid wherein the acyl moiety is an aliphatic hydrocarbon and contains at least 6 carbon atoms.

6. As an emulsifier, a di-fatty acid ester of hexahydrokojic acid wherein the acyl moiety is an aliphatic hydrocarbon and contains at least 6 carbon atoms.

7. A process for preparing a partial fatty acid ester of hexahydrokojic acid comprising reacting hexahydrokojic acid with an aliphatic carboxylic acid acylating agent wherein the acyl group moiety is hydrocarbon.

8. A process as claimed in claim 7 wherein the aliphatic carboxylic acid acylating agent is an acid halide and the process is carried out in the presence of a tertiary organic amine.

9. A process for preparing a partial fatty acid ester of hexahydrokojic acid which comprises contacting hexahydrokojic acid with a fatty acid triglyceride containing only hydrogen, carbon, and oxygen in the presence of a transesterification catalyst at an elevated temperature.

References Cited in the file of this patent

UNITED STATES PATENTS

| | | |
|---|---|---|
| 2,322,821 | Brown | June 29, 1943 |
| 2,382,398 | Cordero | Aug. 14, 1945 |
| 2,480,347 | Wittcoff | Aug. 30, 1949 |
| 2,513,133 | Hatch | June 27, 1950 |

UNITED STATES PATENT AND TRADEMARK OFFICE
CERTIFICATE OF CORRECTION

PATENT NO.   : 5,831,000
DATED        : November 3, 1998
INVENTOR(S)  : Eigoro Murayama and Tohru Hoshi Page 1 of 1

It is certified that error appears in the above-identified patent and that said Letters Patent is hereby corrected as shown below:

Title page,
Item [63], after "abandoned", insert -- , which was a §371 of PCT/JP91/00462 filed on Apr. 8, 1991 --.

Column 1,
Line 3, delete "od" and insert therefor -- of --.
Line 4, after "abandoned", insert -- , which is a §371 of PCT/JP91/00462, filed Apr. 8, 1991 --.

Signed and Sealed this

Ninth Day of April, 2002

*Attest:*

JAMES E. ROGAN
*Attesting Officer*  *Director of the United States Patent and Trademark Office*